United States Patent
Skertic et al.

(10) Patent No.: US 10,313,026 B2
(45) Date of Patent: Jun. 4, 2019

(54) POWER AND COMMUNICATIONS OVER FIBER OPTIC CABLING

(71) Applicants: Rolls-Royce North American Technologies, Inc., Indianapolis, IN (US); Rolls-Royce Corporation, Indianapolis, IN (US)

(72) Inventors: Richard Joseph Skertic, Carmel, IN (US); John Joseph Costello, Indianapolis, IN (US)

(73) Assignees: Rolls-Royce North American Technologies, Inc., Indianapolis, IN (US); Rolls-Royce Corporation, Indianapolis, IL (US)

( * ) Notice: Subject to any disclaimer, the term of this patent is extended or adjusted under 35 U.S.C. 154(b) by 0 days.

(21) Appl. No.: 15/634,453

(22) Filed: Jun. 27, 2017

(65) Prior Publication Data
US 2018/0375590 A1    Dec. 27, 2018

(51) Int. Cl.
*H04B 10/80* (2013.01)
*G08C 23/04* (2006.01)
(Continued)

(52) U.S. Cl.
CPC ............ *H04B 10/808* (2013.01); *G08C 23/04* (2013.01); *H04B 10/25* (2013.01); *H04B 10/516* (2013.01);
(Continued)

(58) Field of Classification Search
CPC ........................ H04B 10/806; H04B 10/807
(Continued)

(56) References Cited

U.S. PATENT DOCUMENTS 4,820,916 A * 4/1989 Patriquin ............. H04B 10/807
250/208.2
4,928,319 A * 5/1990 Pitt ...................... H04B 10/807
257/432
(Continued)

FOREIGN PATENT DOCUMENTS

EP    0290243 A2    9/1988
EP    1956493 A1    8/2008
(Continued)

OTHER PUBLICATIONS

"Photovoltaics," U.S. Naval Research Laboratory, Electronics Science and Technology Division, retrieved from https://www.nrl.navy.mil/estd/research-highlights/photovoltaics, on May 8, 2017, 1 pp.
(Continued)

*Primary Examiner* — Li Liu
(74) *Attorney, Agent, or Firm* — Shumaker & Sieffert, P.A.

(57) ABSTRACT

The disclosure is directed to delivering power to and communication with optical devices, such as sensors and effectors using only optical fibers. The device may receive optical energy from a fiber optic cable simultaneously with receiving communication in the form of inverse signaling. Inverse signaling means the light is on for longer than the light is off which may allow the device may receive more optical energy than when using normal signaling. Normal signaling means the light is off for longer than the light is on. The device may perform sensing or other functions using the received optical energy. The device may send communications through at least one optical fiber that may be separate from the one or more optical fibers from which the device receives communication and optical energy. The device may send communication using normal signaling, which uses less energy than inverse signaling.

16 Claims, 4 Drawing Sheets

(51) Int. Cl.
*H04B 10/25* (2013.01)
*H04J 14/02* (2006.01)
*H04B 10/516* (2013.01)

(52) U.S. Cl.
CPC ............ *H04B 10/807* (2013.01); *H04J 14/02* (2013.01); *H04B 2210/516* (2013.01)

(58) Field of Classification Search
USPC .......................................................... 398/171
See application file for complete search history.

(56) References Cited

U.S. PATENT DOCUMENTS

| | | | | |
|---|---|---|---|---|
| 5,528,409 | A * | 6/1996 | Cucci | H04B 10/807 398/113 |
| 7,359,647 | B1 * | 4/2008 | Faria | H02J 17/00 398/171 |
| 7,844,154 | B2 | 11/2010 | Bookbinder et al. | |
| 7,965,948 | B1 | 6/2011 | Bugash et al. | |
| 9,154,235 | B2 | 10/2015 | Scherer et al. | |
| 9,525,312 | B2 | 12/2016 | Scherer et al. | |
| 2007/0092264 | A1 * | 4/2007 | Suzuki | H04B 10/1141 398/189 |
| 2008/0235418 | A1 * | 9/2008 | Werthen | G06F 13/385 710/106 |
| 2009/0129781 | A1 * | 5/2009 | Irie | H04B 10/1125 398/98 |
| 2014/0270789 | A1 * | 9/2014 | Coffey | H04B 10/807 398/116 |
| 2014/0320313 | A1 * | 10/2014 | Bae | H02J 17/00 340/870.28 |
| 2015/0132006 | A1 * | 5/2015 | Inoue | H05B 37/0263 398/118 |
| 2015/0335231 | A1 * | 11/2015 | Van Der Mark | H04B 10/2503 600/301 |
| 2017/0338889 | A1 * | 11/2017 | Dinh | H04B 10/25 |
| 2018/0083715 | A1 * | 3/2018 | Greene | H04B 10/806 |

FOREIGN PATENT DOCUMENTS

| | | |
|---|---|---|
| WO | 01/88875 A1 | 11/2001 |
| WO | 2014097215 A1 | 6/2014 |
| WO | 2015/055250 A1 | 4/2015 |

OTHER PUBLICATIONS

Morra, "Fiber Optics Transmit Data and Power Over Same Cable," electronicdesign.com, Jan. 29, 2016, 4 pp.

Ayre, "Triple-Junction Solar Cell Being Developed by US Navy is to Break Through the 50% Conversion Efficiency Barrier," Clean Technica, cleantechncia.com, Jan. 15, 2013, 2 pp.

"Photovoltaic Effect," Wikipedia, the free encyclopedia, retrieved from https://en.wikipedia.org/wiki/Photovoltaic_effect, Apr. 13, 2017, 2 pp.

Extended Search Report from counterpart European Application No. 18177017.3, dated Nov. 23, 2018, 8 pp.

* cited by examiner

POWER AND COMMUNICATIONS OVER FIBER OPTIC CABLING

TECHNICAL FIELD

The disclosure relates to transmission of communication, data and power via fiber optics.

BACKGROUND

Electronic sensors, actuators and other devices may send and receive signals using electrical wire or a wire harness, made from, for example copper or aluminum wire. Some sensors may be located remotely from a controller or other computing device, and may be controlled and return information to the controller or other computing device over a hardwired interface. In other examples, sensors, actuators, and other device may send and receive signals using optical fibers, or wirelessly. However, each of these approaches has advantages and disadvantages.

SUMMARY

In general, the disclosure is directed to delivering power to and communication with devices, such as sensors, detectors, actuators, effectors, other transducers and similar components using only optical fibers. A device, according to the techniques of this disclosure, may receive optical energy from an optical fiber simultaneously with receiving communication in using an inverse signaling protocol. In an inverse signaling protocol, a device outputs light to represent a logical zero and does not output light to represent a logical one. This may result in light being output for a longer time than the light is not output, on average. In this way, the device may receive more optical energy than when using a normal signaling protocol. In a normal signaling protocol, a device outputs light to represent a logical one and does not output light to represent a logical zero. When using an inverse protocol, a device may be configured to interpret a series of sequential zeros as not representing data, such that light can be transmitted to provide power even when communications signals are not being transmitted. In other examples, the communication and optical energy may be phased simultaneously with multiple optical frequencies or a combination of inverse signal protocol and multiple optical frequencies.

The remote device may send communications back to a controller through at least one optical fiber that may be separate from the one or more optical fibers from which the device receives communication and optical energy. The remote device may send communication using normal signaling, which may use less energy than inverse signaling.

In one example, the disclosure is directed to a method comprising: receiving, by an optical device and via an optical fiber, a first optical signal encoded using an inverse signaling protocol, converting, by the optical device, the first optical signal into an electrical signal, performing, by the optical device, at least one function in response to the optical signal, and outputting, by the optical device, via the optical fiber, an outgoing optical signal encoded using a normal signaling protocol.

In another example, the disclosure is directed to an optical device comprising; an optical signal input element, wherein the optical signal input element is configured to receive a first optical signal encoded using an inverse signaling protocol, an optical signal detector configured to: receive at least a first portion of the first optical signal from the optical signal input element, and extract a first communication signal from the at least a first portion of first optical signal. The optical device further comprises device electronics configured to, in response to receiving the first communication signal from the optical signal detector, perform at least one function; and an optical signal transmitter configured to: receive a second communication signal from the device electronics, convert the second communication signal to an optical output signal encoded using a normal signaling protocol; and output the optical output signal.

In another example, the disclosure is directed to a system comprising, a controller, comprising: one or more processors, a controller optical signal output element; and a controller optical signal input element, a first optical fiber and a second optical fiber, an optical device, comprising: an optical signal input element, wherein the optical signal input element is configured to receive a first optical signal encoded using an inverse signaling protocol from the controller optical signal output element via the first optical fiber, an optical signal detector configured to: receive at least a first portion of the first optical signal from the optical signal input element, and extract a first communication signal from the at least a first portion of first optical signal, device electronics configured to, in response to receiving the first communication signal from the optical signal detector, perform at least one function; and an optical signal transmitter configured to: receive a second communication signal from the device electronics, convert the second communication signal to a second optical signal encoded using a normal signaling protocol; and output the second optical signal to the controller optical signal input element via the second optical fiber.

The details of one or more examples of the disclosure are set forth in the accompanying drawings and the description below. Other features, objects, and advantages of the disclosure will be apparent from the description and drawings, and from the claims.

DETAILED DESCRIPTION

This disclosure is directed to delivering power to and communication with optical devices, such as sensors, detectors, actuators, effectors and similar components by using optical fibers, e.g., using only optical fibers. An optical device, according to the techniques of this disclosure, may receive optical energy, e.g., from a controller, via an optical fiber simultaneously with receiving communication using an inverse signaling protocol and/or multiple frequencies. As used herein, an inverse signaling protocol sends communication signals in which a decrease in light is indicative of a Boolean one and an increase in light is an indication of a Boolean zero. By using an inverse signaling protocol, the device receives more light compared to a normal signaling protocol in which a decrease in light is indicative of a Boolean zero and an increase in light is an indication of a Boolean one. The optical device may be configured to interpret a series of sequential Boolean zeros (e.g. a number of Boolean zeros greater than a threshold number) as not representing data, such that in the inverse signaling protocol, the sending device can continue to transmit light to provide power to the optical device even when communications signals are not being transmitted.

In some examples, the optical device may receive optical energy from two or more optical fibers, which may allow the optical device to receive more optical energy than from a single fiber. The optical device may include a component that converts the optical energy into electrical energy, such as a photovoltaic component. Advances in the efficiency of photovoltaic cells in some examples may increase the amount of power that may be effectively delivered to the device by using optical energy. A photovoltaic component may include any of a variety of components, such as a photodiode, a phototransistor, a solar cell, a single or a polycrystalline photovoltaic cell, or the like. The optical device may store the electrical energy in an energy storage component, such as a battery, capacitor, supercapacitor, or the like, and may use the electrical energy to perform one or more functions. Some example functions of an optical device of this disclosure may include sensing temperature, pressure, speed or flow rate, or actuating a relay or similar device to control lighting or motor operation, or the like. An actuator that controls a relay, for example, may receive control signals actuating the relay using inverse signaling simultaneously with receiving the optical energy to power the actuator.

In some examples, the optical device may send communication signals back to the controller through at least one optical fiber that is separate from the one or more optical fibers from which the optical device receives communication signals and optical energy. For example, an optical device that includes a pressure sensor may send data signals over the optical fiber that include the oil pressure of an engine. The optical device may output communication signals using normal signaling protocol, which may consume less energy than inverse signaling, as the normal (Boolean zero) state is not outputting any light. In other words, when transmitting an optical signal using a normal signaling protocol such that the light is off for more than it is on, the optical device may require less energy to output the optical signal. In this way, an optical device according to the techniques of this disclosure may operate by using optical fibers to both receive power and send and receive communication signals. In some examples, such optical devices may omit electrical cabling (e.g., copper or aluminum wires) and receive all operating power using only optical fibers. The optical device may be referred to as an optical node device or an optical device.

Figure 1:
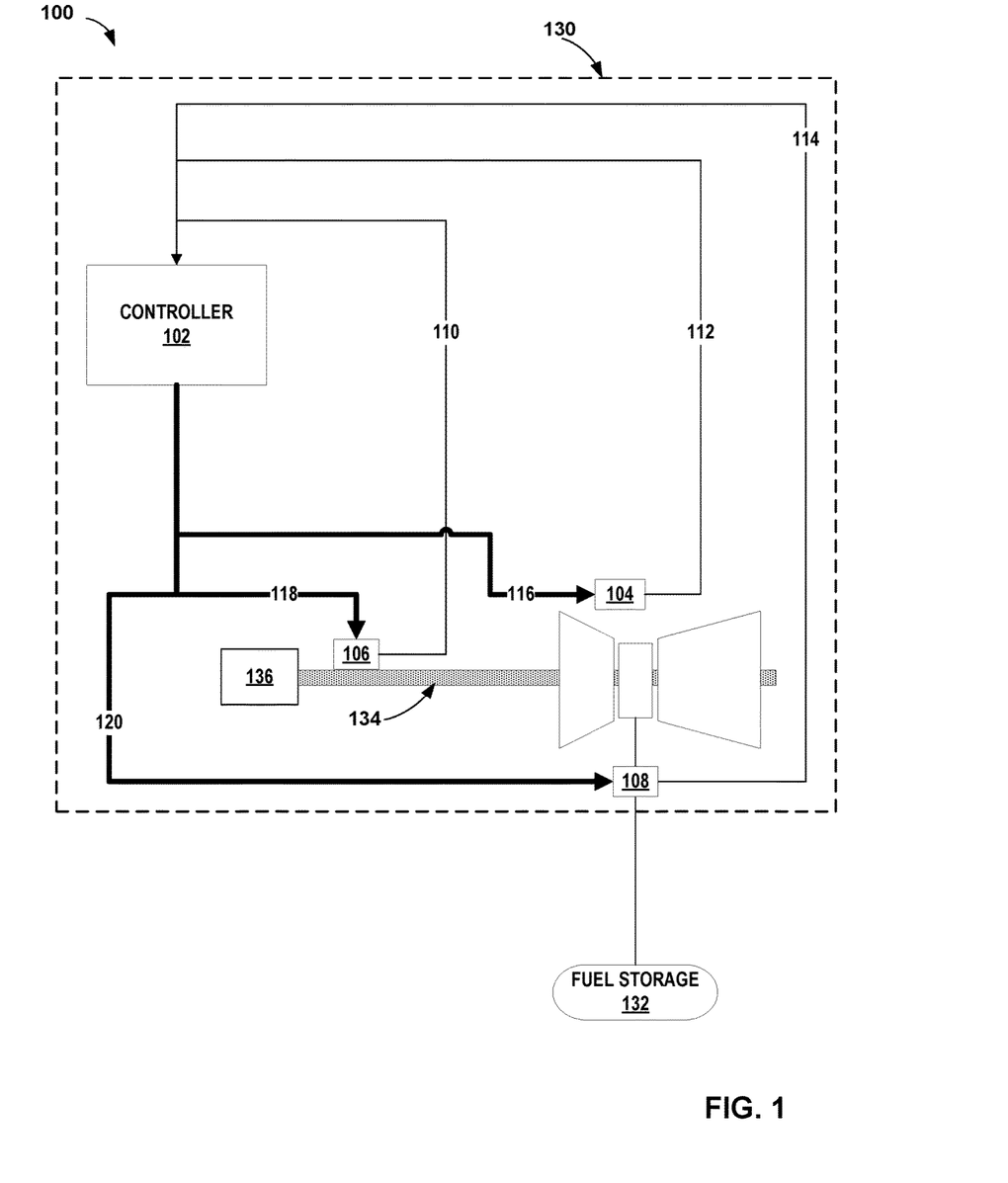
FIG. 1 is a conceptual and schematic block diagram illustrating a system that includes a controller in communication with various optical devices via optical fibers, in accordance with one or more techniques of this disclosure.

FIG. 1 is a conceptual and schematic block diagram illustrating a system 100 that includes a controller 102 in communication with various optical devices 104, 106, and 108 via optical fibers 110, 112, and 114, in accordance with one or more techniques of this disclosure. The example of FIG. 1 depicts optical devices 104, 106, and 108 as sensors or actuators on or in a gas turbine engine 130. However, optical devices 104, 106, and 108 according to this disclosure may be used in many other applications. Some examples may include: flap position sensor or landing gear position sensor on an aircraft, oil pressure or other sensors on an automobile engine, railway applications, a valve actuator in a manned or unmanned spacecraft, industrial controls, such as in manufacturing, refinery, or mining equipment, and various other applications.

System 100 may use optical devices 104, 106, and 108 to sense and control various functions of gas turbine engine 130. Gas turbine engine 130 may drive machine 136 (e.g., a propulsor or a generator) through shaft 134 and receive fuel from fuel storage 132.

Controller 102 may send optical power and communication messages to optical devices 104-108 and receive optical signals from the optical devices 104-108. In some examples, controller 102 may control the function of gas turbine engine 130, e.g., via optical devices 104-108 or other devices coupled to optical devices 104-108. Controller 102 may be installed directly on or in gas turbine engine 130 or may be in another location, such as in the cockpit of an aircraft, the control room of a marine vessel or a power generation plant, or some other location. Controller 102 may include one or more processors, memory, input and output ports, wired and wireless communication and other components.

Some examples of a processor may include, any one or more of a microprocessor, a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry.

Controller 102 may include a plurality of optical signal output elements configured to deliver optical signals encoded using an inverse signaling protocol to optical devices 104-108. In some examples, an inverse signaling protocol includes first intervals where controller 102 outputs light that represent logical zeroes. Inverse signaling protocol may also include second intervals representing logical ones with no light output. In other words, when controller 102 outputs light to an optical devise of optical devices 104-108 during an interval, controller 102 may be sending both a logical zero and optical energy. Optical devices 104-108 may be configured to interpret a series of sequential logical zeros (e.g. a number of logical zeros greater than a threshold number) as not representing data, such that in the inverse signaling protocol, controller 102 can continue to transmit light to provide power to the optical device of optical devices 104-108 even when controller 102 is not transmitting communications signals.

Other examples of inverse signaling protocol may include examples with more than one state, such as a high, middle and low amplitude of light output. In these examples, the inverse signaling protocol may be such that controller 102 sends a logical zero when the light is on.

Controller 102 may send optical signals to respective optical devices of optical devices 104-108 via respective optical fibers of optical fibers 116-120. Controller 102 may receive optical signals output from respective optical devices of optical devices 104-108 through respective optical fibers of optical fibers 110-114. As such, each optical device of optical devices 104-108 may be optically connected to controller 102 via at least two separate optical fibers (e.g., one optical fiber of optical fibers 110-114 and one optical fiber of optical fibers 116-120). In some examples, a respective pair that includes one optical fiber of optical fibers 110-114 and one optical fiber of fiber optic cables 116-120 may be bundled together in a single fiber optic cable, which may be referred to as a multi-mode fiber optic cable. In other words, optical fiber 114 from optical device 108 may be included in the same fiber optic cable as optical fiber 120. Optical fibers and cables will be described in more detail in relation to FIG. 2 below.

Optical devices 104-108 may receive optical signals from controller 102 encoded using an inverse signaling protocol and/or using multiple frequencies. Optical devices 104-108 may convert at least a portion of the optical signal into an electrical signal. The optical devices may store a portion of the electrical signal in an electrical energy storage element, such as a battery and perform one or more actions based on a communication encoded in the optical signal. In other words, optical devices 104-108 may further store at least a portion of energy in the optical signal in an electrical energy storage element, which may then be used to energize the remote sensor or actuator node. For example, optical device 104 may include a temperature sensor on a power turbine of gas turbine engine 130. Optical device 104 may include a thermistor, or other temperature sensing device, along with device electronics to determine the temperature of the power turbine. The device electronics of optical device 104 may convert the temperature information into an optical signal, which is encoded using a normal signaling protocol. As described above, in a normal signaling protocol, optical device 104 outputs light to represent a logical one and does not output light to represent a logical zero. A normal signaling protocol may consume less power than an inverse signaling protocol. Optical device 104 may output the outgoing optical signal via optical fiber 112 to controller 102. Controller 102 may use this information to control other functions of gas turbine engine 130. In other examples, controller 102 may transmit the power turbine temperature information to a display unit or other components of system 100 (not shown in FIG. 1). Other examples are possible in which optical device 104 includes a different type of sensor, actuator, relay, or the like.

As another example, optical device 106 may sense an operating parameter of shaft 134, such as the rotational speed in revolutions per minute (rpm). Optical device 106 may likewise receive optical signals from controller 102 that include optical energy and communication signals via fiber optic cable 118, e.g., using an inverse signaling protocol, which may allow controller 102 to more efficiently provide power (e.g., provide a higher average energy per unit time) to optical device 106 than a normal signaling protocol. In other examples, optical device 106 may include a speed control device, such a brake. In response to an optical signal from controller 102, optical device 106 may actuate a brake to slow down shaft 134. Optical device 106 may communicate brake status, shaft rpm, or the like to controller 102 via optical signals using optical fiber 110, e.g., via a normal signaling protocol.

As another example, optical device 108 may include a fuel flow sensor, a fuel control valve, or the like. In response to an optical signal from controller 102, which controller 102 may send using an inverse signaling protocol, optical device 108 may actuate the fuel control valve to increase or decrease fuel flow, may sense a fuel flow, or the like. Device electronics in optical device 108 may convert fuel flow information, valve status information, or the like, into an optical signal encoded using a normal signaling protocol. Optical device 108 may output the optical signal to controller 102 via optical fiber 114. In some examples, an optical device may also communicate directly with another optical device instead of or in addition to communicating with controller 102.

Optical devices 104-108 that receive optical energy and communications via optical fibers may possess advantages over sensors, actuators and effectors that operate with metal conductive wires, such as copper (Cu) or aluminum (Al) wire. Some advantages may include lighter weight, less susceptibility to electromagnetic interference (EMI), lightning and electromagnetic pulses (EMP); and easier installation. For example, in some applications, fiber optic cables may be more easily manipulated through machinery and structures than wire, as wire may be less flexible or more bulky due to larger size, higher stiffness, additional structural components such as shielding, or the like.

As another example, fiber optic cables may also be able to operate over a wider temperature range and be less susceptible to signal variations (e.g., noise) because of the temperature coefficient of resistivity (TCR) of metal conductive wires. Metal conductive wires may require shielding, such as with coaxial cables and ferrite components, in addition to the wire conductors that carry power or communication, which may increase weight and size of metal conductive wires compared to fiber optic cables. In some examples, fiber optic cables may also have improved system life-cycle costs and improved data transmission capability when compared to metal conductive wires. Fiber optic systems may also have advantages over wireless systems, because wireless sensors may require either an integral battery or other method of collecting the local energy to power the device (e.g., metal conductive wires). Fiber optic system may be more secure communication networks with respect to signal transmission and possible interception or security intrusions when compared to metal conductive wires. In some examples, communication over fiber optic systems may be more difficult to jam or intercept, when compared to wireless, or electrical cables. Consequently, in some examples, fiber optics provide a control system that is more robust with respect to cyber security threats.

Optical devices that receive both optical energy and communication may be configured as "smart nodes." In comparison to a passive node like a simple sensor, such as a temperature sensor, or simple actuator, such as a valve, a smart node may include some processing capability. In some examples, an optical device configured as a smart node may provide an analog or other output, may execute signal processing, analog to digital data processing, and may include some on-board memory. The on-board memory may store measured values over time, may include instructions that may be executed by one or more processors, and may act as temporary data storage. In the example of a gas turbine engine, the addition of smart nodes may provide improvements in engine performance, such as specific fuel consumption, as the smart nodes may facilitate a real-time control system. Smart nodes may include embedded control algorithms for real time data processing and real-time control functions.

In the example of one or more gas turbine engines installed on an aircraft, the techniques of this disclosure may enable the integration of remotely powered sensor or actuation nodes that are optically powered to be used for real time engine control as a part of a larger control system that is interconnected via fiber optic links. This optical interconnection may provide distinct advantages over traditional control networks with the elimination of copper wiring and wiring harnesses, as described above. Replacing a wiring harness with a fiber optic network may facilitate global control with respect to both the engine and airframe interfaces, such as control surfaces, other non-engine sensors such as airspeed, static pressure and the like. In some examples, data retrieved from the control system can be post-processed to determine trends in engine performance and provide maintenance annunciation as required. In other words, the data may be transmitted in real time, or logged for review after a flight cycle.

In some examples, a smart node may include processing circuitry to enhance cyber security, such as by detecting an intrusion or monitoring of communication signals. For example, a smart node may include an algorithm to determine whether a decrease in light energy intensity compared to an expected intensity is due to aging or wear, a hardware failure, or an intrusion attempt. Smart nodes with enhanced security circuitry may be advantageous, such as on military aircraft, unmanned aerial vehicles (UAV), or other applications where control of engine systems or other systems may be subject to attack.

Figure 2:
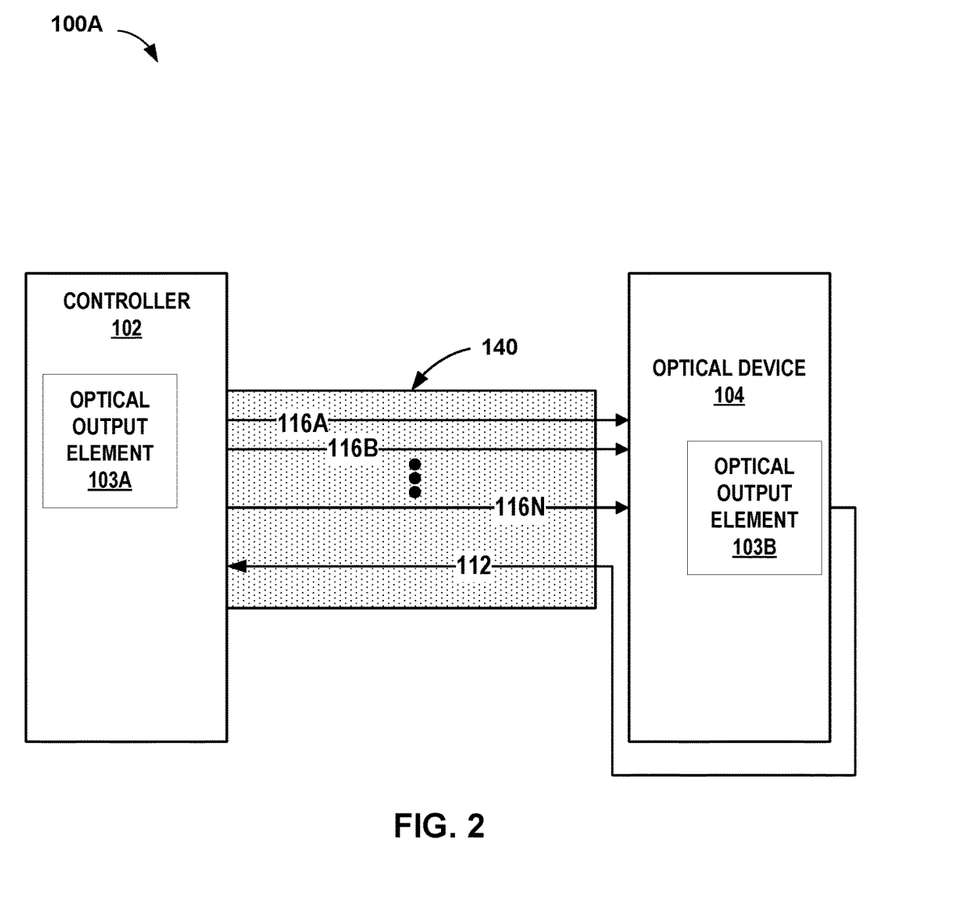
FIG. 2 is a conceptual diagram illustrating an example system that includes a controller and an optical device exchanging signals via optical fibers, in accordance with one or more techniques of this disclosure.

FIG. 2 is a conceptual diagram illustrating a system 100A that includes an example controller 102 and optical device 104 exchanging signals via a fiber optic cable 140, in accordance with one or more aspects of this disclosure. System 100A depicted in FIG. 2 corresponds to a portion of system 100 depicted in FIG. 1. System 100A includes controller 102, optical device 104, and fiber optic cable 140. Controller 102 and optical device 104 correspond to the components with the same reference numbers depicted in FIG. 1.

Controller 102 performs the same functions as described above in relation to FIG. 1. Controller 102 may include one or more processors, one or more optical receiving elements, such as photodiodes, photoresistors and the like, as well as other wired or wireless input and output elements, such as Bluetooth, Ethernet, power supply and the like (not shown in FIG. 2). In some examples, controller 102 may also include one or more optical output elements 103A that may send data and optical energy through fiber optic cable 140. Some examples of optical output element 103A may include lasers, light emitting diodes (LED), or similar light sources.

Fiber optic cable 140 may include one or more optical fibers 116A-116N (collectively, "optical fibers 116"). Optical fibers 116 may be optically coupled to respective optical ports of controller 102 through which controller 102 outputs optical signals and optically coupled to respective optical ports of optical device 104 through which optical device 104 receives optical signals. Fiber optic cable 140 may also include one or more optical fibers, such as optical fiber 112. Optical fiber 112 may be optically coupled to an optical port of optical device 104 through which optical device 104 outputs optical signals and an optical port of controller 102 through which controller 102 receives optical signals.

In some examples, a first optical fiber, such as optical fiber 116A, may carry optical signals from controller 102 encoded using an inverse signaling protocol. In this example, the optical signals on optical fiber 116A may include both a power optical signal and a communication optical signal. In some examples, additional optical fibers, such as optical fibers 116B-116N may carry power optical signals to optical device 104, with or without additional communication optical signals. In some implementations, an optical fiber, such as a multi-mode fiber (MMF) may carry approximately 60 W of energy over a distance of approximately 300 meters. Therefore, three optical fibers, e.g. optical fibers 116A, 116B and 116N, may carry 180 W (180 W=3×60 W) of energy to optical device 104. In some examples, controller 102 may output optical signals using a light source capable of outputting an optical signal with a selected optical power. Additional power may be provided by controller 102 to optical device 104 by including additional optical output devices optically coupled to additional optical fibers 116.

As outlined above in relation to FIG. 1, an inverse signaling protocol may include first intervals representing logical zeroes and second intervals representing logical ones. Optical device 104 may receive optical energy from controller 102 via the optical signal during the first interval. In other words, in this example, the light is on during the first interval, and optical device 104 receives both optical energy and a logical zero during the first interval. During the second interval, the light is off, indicating a digital one. In this disclosure, digital zero and logical zero, may be used interchangeably. Similarly, digital one and logical one may be used interchangeably.

In some examples, an inverse signaling protocol, with first intervals representing logical zeroes (light on) and second intervals representing logical ones (light off), may include a baseline optical power amplitude during both the first and second intervals. For example, the logical ones and logical zeros may be defined by amplitude modulation from the baseline optical power amplitude. During inverse signaling protocol, controller 102 may transmit optical energy during periods when controller 102 is sending no communication signal. In other words, between communication signals, controller 102 may output the logical zero state. Therefore, the light is on and controller 102 transmits optical energy. In this way, inverse signaling protocol may enable controller 102 to efficiently transfer power to optical device 104.

In contrast, optical device 104 may output optical communication signals using normal signaling protocol via optical fiber 112. As outlined above, normal signaling protocol may include first intervals representing logical zeroes and second intervals representing logical ones. Optical device 104 may output optical energy during the second intervals that indicate a logical one. In other words, normal signal may be considered the opposite or converse of inverse signaling. Therefore, when optical device 104 is sending no communication signal, optical device 104 may output a logical zero (light off), which may require less energy than using inverse signaling protocol. This may preserve the energy in the energy storage element of optical device 104. Optical device 104 may include one or more optical output elements 103B, which may include lasers, LED or similar light sources, as described above for optical elements 103A.

In some examples, each optical fiber of optical fibers 112 and 116 may carry optical energy at a different frequency, or a multi-mode optical fiber may carry optical energy at multiple frequencies. In this disclosure, light frequency and light wavelength may be used interchangeably. For example, optical fiber 116A may carry optical energy in wavelengths near infrared (IR), while optical fiber 116B may carry optical energy in wavelengths near ultraviolet (UV). Using different wavelengths may have some advantages in some applications such as improved photovoltaic efficiency at some frequencies and reduced interference between signals at the different frequencies. In some examples, the communication optical signal may be at one frequency and the power optical signal may be at one or more separate frequencies. The optical power transmitted at a different wavelength may improve throughput in the fiber optic cable.

As describe above and below, the transmission can be either phased with inverse signal protocol or simultaneously with different optical frequencies. The optical energy transmitted corresponds to Planck's formula, where photon energy (E) is according to the equation: $E=h\nu$. In this equation, h is Planck's constant of $6.63 \times 10^{-34}$ Joule-Seconds and v is the frequency of the light. In some examples, in addition to inverse signal protocol, the techniques of this disclosure may use normal or inverse signal protocol and to transmit the communications at one optical frequency, e.g. UV wavelengths, and to transmit the power at a second frequency, e.g. IR wavelengths.

Sending optical signals at different frequencies and/or via different optical fibers may also offer advantages in cross-checking and security. For example, controller 102 may send duplicate signals to optical device 104 on two separate optical fibers using two different frequencies. The device electronics in optical device 104 may compare the two signals to determine if the signals match. Optical device 104 may send an error signal, security alert signal, or take some other action if the signals do not match. Comparing two signals may be one technique to prevent false signals, such as from a hacker, from controlling the functions of optical device 104. In this way, the techniques of this disclosure may provide redundancy for signal and power transfer and system safety as well as cyber security for communication and control of optical devices and systems that may use the optical devices of this disclosure.

In other examples, controller 102, optical device 104, or both may output communications over more than one optical fiber. An optical device that transmits over multiple fibers may take advantage of improved security and reliability. However, transmitting over multiple fibers may utilize more energy and drain the energy storage element of the optical device 104 more quickly.

Figure 3:
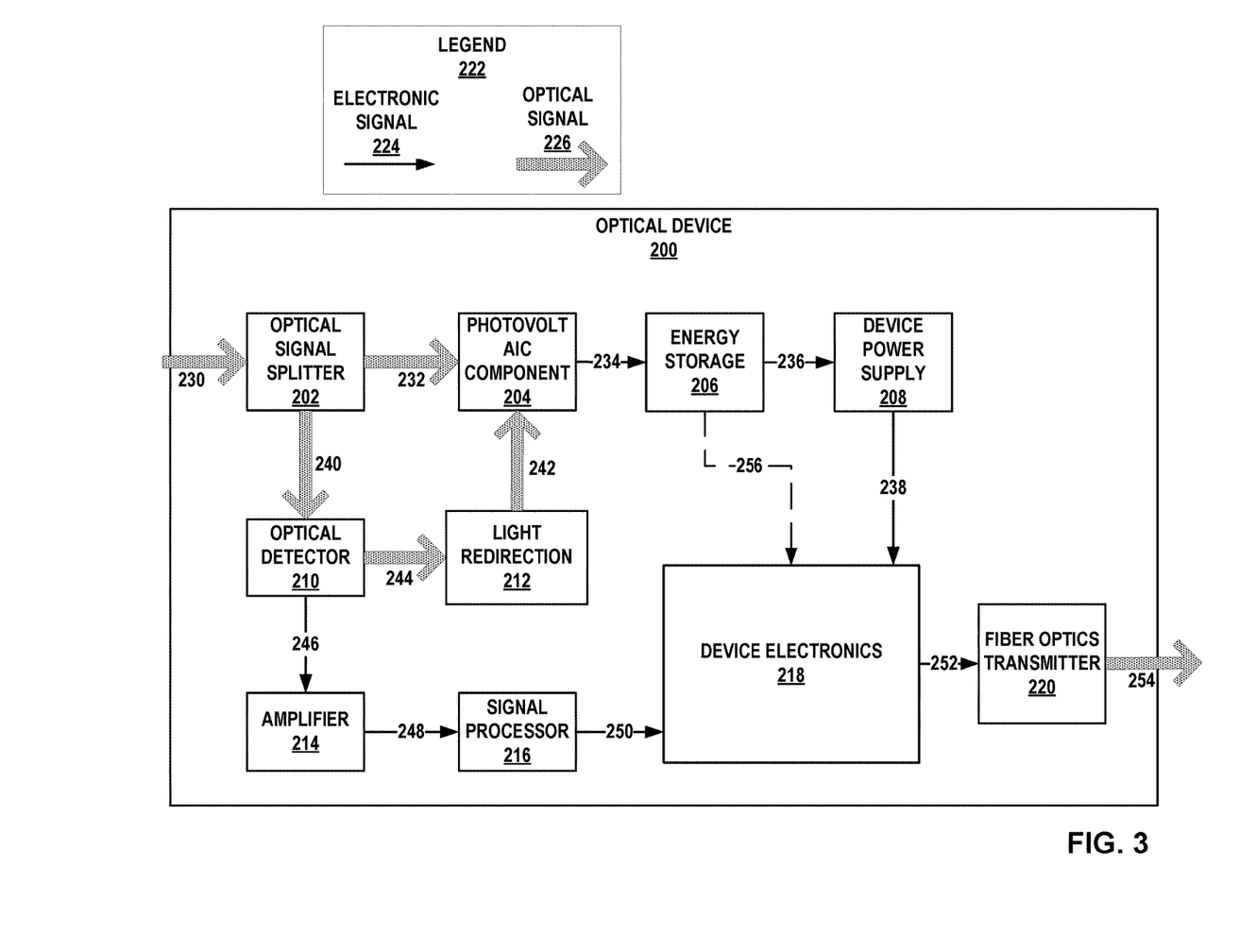
FIG. 3 is a functional block diagram illustrating an example optical device, in accordance with one or more techniques of this disclosure.

FIG. 3 is a functional block diagram illustrating an example optical device 200, in accordance with one or more techniques of this disclosure. The components of optical device 200 are one example configuration of an optical device of this disclosure. Other examples of optical device 200 may include more or fewer components, a different arrangement than that depicted by FIG. 3, or the like. Optical device 200 may correspond to any one of optical devices 104-108 depicted in FIGS. 1 and 2.

Optical device 200 may include a sensor, transducer, actuator, effector, or the like, as described above. In the example of FIG. 3, optical device 200 may include optical signal splitter 202, photovoltaic component 204, electrical energy storage element 206, device power supply 208, optical detector 210, light redirection element 212, amplifier 214, signal processor 216, device electronics 218, and fiber optics transmitter 220. Optical signals in optical device 200 are indicated with an optical signal, as shown in legend 222. Electronic signals are indicated by electronic signal arrow 224. Optical device 200 may receive a first optical signal 230, such as from controller 102, using an inverse signaling protocol and output a second optical signal 254 using normal signaling protocol. In some examples, optical device 200 may receive the first optical signal 230 via a first optical port and output second optical signal 254 via a second optical port.

Optical signal splitter 202 may be an optical signal input element of optical device 200. Optical signal splitter 202 may be configured to receive an optical signal encoded using an inverse signaling protocol, such as from controller 102. In some examples, optical signal splitter 202 may be configured to split received optical signal 230 into a power optical signal and a communication optical signal. For example, optical signal splitter 202 may include a beam splitter. Optical signal splitter 202 may split a portion of the received optical signal 230 into optical signal 240 and direct optical signal 240 to optical detector 210. Optical signal splitter 202 may send the remaining portion of optical signal 230 to photovoltaic component 204 as optical signal 232. Some examples of received signal splitter 202 may be configured to receive optical signals over multiple optical fibers, such as one or more MMF, as described above in relation to FIG. 2.

In some examples, optical signal splitter 202 may separate a power optical signal on one frequency from a communication optical signal on a separate frequency. For example, the communications optical signal may be at one optical frequency, e.g. UV wavelengths and the power optical signal at a second frequency, e.g. IR wavelengths. In some examples using separate frequencies, the communication optical signal may use either inverse or normal signaling, and the power optical signal may be a pulsed signal or a continuous signal. A continuous signal may have an advantage in transferring more optical energy per unit of time when compared to a pulsed power optical signal.

Photovoltaic component 204 may be configured to receive optical signal 232 from the optical signal splitter 202, and convert optical signal 232 to electrical power. Photovoltaic component 204 may be any component that converts an optical signal into electrical energy. Some examples may include single or poly crystalline photovoltaic (PV) cells, epitaxial PV cells, grown by techniques such as metal-organic chemical vapor deposition (MOCVD) or molecular beam epitaxy (MBE) on crystalline substrates such as InP, GaAs, and Ge and other PV techniques, or the like. Some PV cells may demonstrate efficiencies of 15% to 30%, and in some examples up to 45%, under concentrated or intense illumination. Examples of PV cells include multi junction PV cells, which is a PV cell that may include several specialized 'junctions' is designed to efficiently absorb and use different wavelength bands in the optical spectrum. In some examples, a photovoltaic component 204 with a multi junction PV cell may be configured to receive optical signals with a variety of wavelengths over multiple optical fibers. Photovoltaic component 204 may also receive redirected optical energy 242 from light redirection element 212 and convert that optical energy into additional electrical Electrical energy storage element 206 may receive electrical energy from photovoltaic component 204 through electrical signal 234. Electrical energy may also be referred to as electrical power in this disclosure. Electrical energy storage element 206 may store at least a portion of the electrical power and provide at least a portion of the stored electrical power to the device electronics 218 through device power supply 208. In some examples, electrical power from photovoltaic component 204 may go directly to device power supply 208. Similarly, in some examples, electrical energy storage element 206 may provide electrical power directly to device electronics 218 via an electrical signal 256, instead of or in addition to providing electrical power to device power supply 208. Electrical energy storage element 206 may be any type of device that may store electrical energy including a battery, a capacitor, a supercapacitor, or the like.

Device power supply 208 may receive electrical power from electrical energy storage element 206 and send electrical power to other components of optical device 200, including device electronics 218. Device power supply may include features such as voltage regulation, over current protection, thermal protection, power smoothing, EMI protection, or the like.

Optical detector 210 may receive optical signal 240 from optical signal splitter 202. In other words, optical detector 210 may receive a split portion of received optical signal 230 from the optical signal input element, optical signal splitter

202. Optical detector 210 may extract a communication signal from the split portion (optical signal 240) of received optical signal 230. Optical detector 210 may output a representation of the information in the communication optical signal as electrical signal 246. For example, optical detector 210 may include a photovoltaic component that converts optical signal 240 to an electrical signal.

Optical detector 210 may also redirect at least a portion of optical signal 240 to photovoltaic component 204 as optical signal 244. In some examples, optical detector 210 may output optical signal 244 directly to photovoltaic component 204, e.g., optical detector 210 may be reflective and reflect light in the form of optical signal 244 to photovoltaic component 204. In other examples, optical detector 210 may output optical signal 244 to light redirection element 212. Light redirection element 212 may further output an optical signal, e.g. optical signal 242, or guide optical signal 244 to photovoltaic component 204.

Amplifier 214 may receive the extracted communication signal from optical detector 210 as electrical signal 246. Amplifier 214 may include any type of amplifier circuit to increase or magnify electrical signal 246. Amplifier 214 may also include various filters, such as low-pass filters, band-pass filters, or other circuitry that may improve the signal to noise characteristics of electrical signal 246. Amplifier 214 may output the amplified electrical signal, which includes information from the extracted communication signal, as electrical signal 248.

Signal processor 216 may be any circuitry configured to receive electrical signal 248 and decode any information included in electrical signal 248. Some examples of information may include timing pulses, requests for measurements, commands from controller 102, or information from other optical devices. For example, signal processor 216 may decode a command to close a fuel valve by ten percent, or to apply a brake, as described in relation to FIG. 1 above. Other examples may include decoded requests by controller 102 for optical device 200 to perform a temperature or pressure measurement. Signal processor 216 may send the decoded information to device electronics 218.

In some examples signal processor 216 may be included as part of device electronics 218. As described above, signal processor 216 may include signal processing capability as well as embedded control algorithms for real time data processing and real-time control functions. This processing capability may be an enabler for the "smart" nodes. These smart nodes have on-board signal processing capability and may be used effectively as remote nodes that may execute real time control functions with some instruction from the engine control unit (ECU). For example, the remote nodes can be programmed with internal algorithms to remotely execute a control function.

Device electronics 218 may receive electrical power via electrical signal 238. Device electronics 218 may be configured to perform any of the functions described above, such as sensing, actuation, or the like. Some examples may include: temperature measurement, pressure measurement, flow rate measurement, rotational speed measurement, relay actuation, valve actuation, flow control, and mechanical position control. As described above, device electronics may include hardware, such as circuitry, one or more processors, input and output communication ports, and memory such computer-readable storage media, which may include instructions that may be executed by the one or more processors.

Device electronics 218 may receive electrical signal 250, which may include commands to perform an operation, or information needed to determine an output. Device electronics 218 then may perform the specified operation or determine the requested output. For example, the function of optical device 200 may include determining volumetric gas flow, which may depend on both flow velocity and flow temperature. Device electronics 218 may include a temperature sensor and a flow sensor. Device electronics 218 may measure a temperature and flow velocity and use the temperature of the gas to determine a volumetric gas flow.

Device electronics 218 may be configured to, in response to receiving a communication signal from optical signal detector 210, perform at least one function. In other examples, device electronics 218 may perform one or more functions without receiving a communication signal, such as a function based on a timing interval, or an operation based on whether a measurement meets a threshold. For example, optical device 200 may activate a relay when a measured temperature exceeds a threshold.

In some examples, device electronics 218 may output or communicate status, measurements, or other information via electrical signal 252. Fiber optic transmitter 220 may receive a communication signal from device electronics 218, convert the communication signal to optical output signal 254 encoded using a normal signaling protocol, and output the optical output signal 254. Optical output signal 254 may be output via an optical fiber to a controller, such as controller 102, a similar computing device or to another optical device. In other words, device electronics 218 may be configured to receive a first communication signal that includes a command to perform some operation. Device electronics 218 may output a second communication signal that includes an indication that the command has been completed.

In some examples, device electronics 218 may include circuitry to determine the energy level of the electrical energy storage element 206. For example, device electronics 218 may include an electrical signal 256 from electrical energy storage element 206. Device electronics 218 may determine whether an energy level of electrical energy storage element 206 is above an energy level threshold. In response to determining the energy level of electrical energy storage element 206 is above the energy level threshold, device electronics 218 may send a signal indicating that the energy level of electrical energy storage element 206 is above the energy level threshold. Similarly, in response to the determining the energy level of electrical energy storage element 206 is below an energy level threshold, device electronics 218 may send a signal indicating that the energy level of electrical energy storage element 206 is below the energy level threshold. A controller, such as controller 102, may use this information to perform a specified action, such as to increase the optical energy output to optical device 200 (e.g., in examples in which the energy level of electrical energy storage element 206 is below the energy level threshold), or reduce communication with optical device 200.

Figure 4:
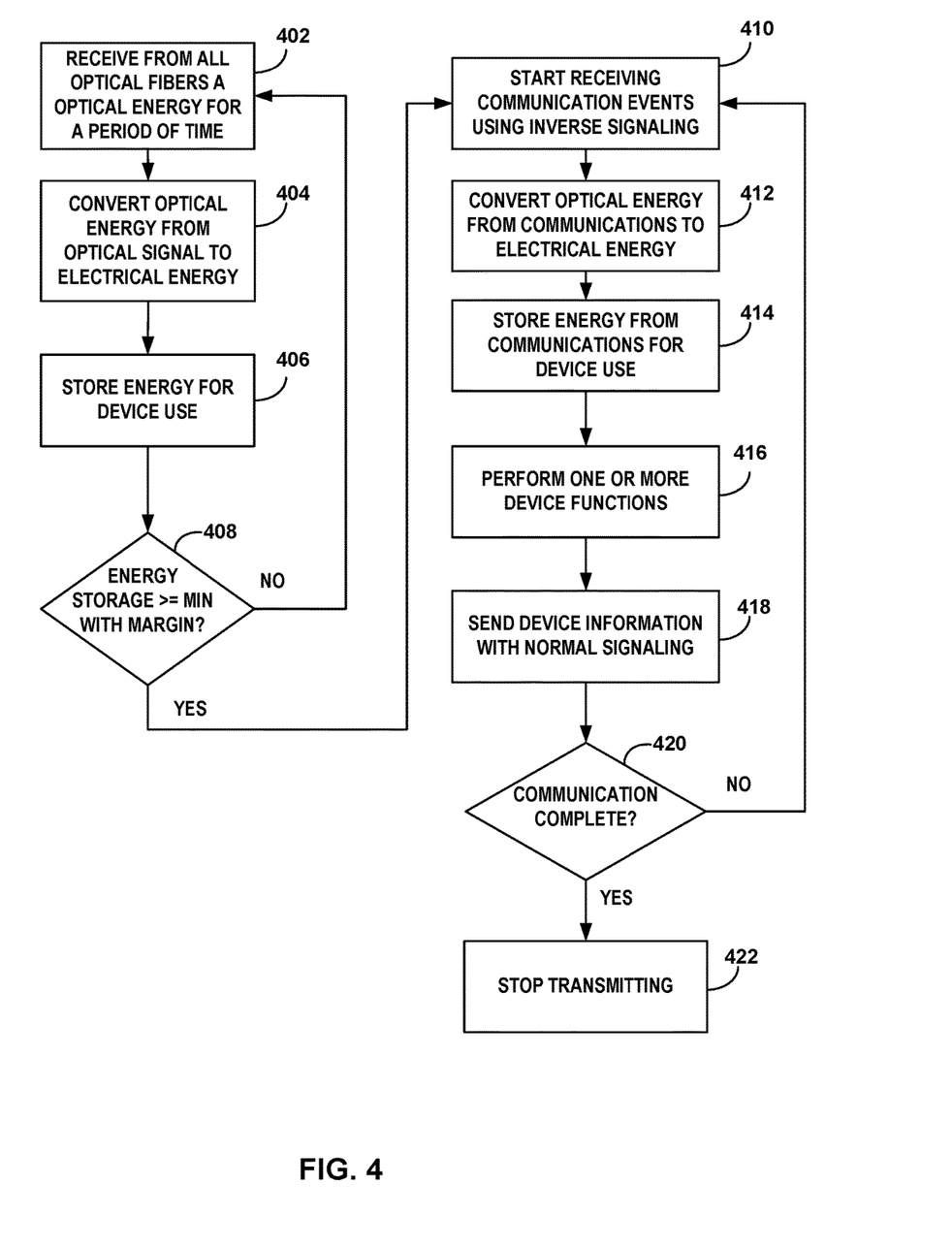
FIG. 4 is a flowchart illustrating an example operation of an optical device in accordance with one or more techniques of this disclosure.

FIG. 4 is a flowchart illustrating an example operation of an optical device in accordance with one or more techniques of this disclosure. In other examples, an optical device, such as optical devices 104-108, may operate with steps not shown in FIG. 4, omit certain steps, or have a different arrangement of steps. The steps of FIG. 4 will be described in relation to FIGS. 1-3.

An optical device, such as optical device 200, may receive via an optical fiber, such as optical fiber 116A, an optical signal 230 encoded using an inverse signaling protocol. In some examples, optical device 200 may additionally receive from all optical fibers 116A-116N, optical energy, such as a high intensity light for a period of time (402). In some examples, as described above, the optical energy may include various wavelengths of optical energy such as IR, UV, visible, or another wavelength. In some examples, optical signal 230 may include both a power optical signal and a communications optical signal. In other examples, optical device 200 may determine that the optical signal from controller 102 only contains a power optical signal. As one example, the optical signal may include a series of logical zeros (light on in the inverse signaling protocol), i.e. a series of 100 or more logical zeros may indicate an optical signal that includes only a power optical signal.

In some examples, the electrical energy available to optical device 200, such as the electrical energy stored in electrical energy storage element 206, may not be sufficient for optical device 200 to perform the functions of optical device 200. In examples in which optical device 200 has insufficient energy to perform one or more functions, or in which the optical signal includes only a power optical signal, photovoltaic component 204 of optical device 200 may simply convert the optical energy from optical signal 230 to electrical energy (404).

Electrical energy storage element 206 may receive electrical energy from photovoltaic component 204. Electrical energy storage element 206 may store at least a portion of the electrical energy for device use (406).

In some examples, optical device 200 may determine whether the electrical energy in electrical energy storage element 206 is greater than a threshold. In other examples, optical device 200 may determine whether the electrical energy available is greater than a threshold plus some energy margin (408). If insufficient electrical energy is available, (NO branch of step 408), optical device 200 may continue to receive optical energy (402). In some examples, optical device 200 may output a signal indicating to controller 102 that it has insufficient electrical energy stored. In other examples, optical device 200 may send no communication in response to a query from controller 102, which may indicate to controller 102 that optical device 200 has insufficient energy available.

In response to determining that optical device 200 has sufficient electrical energy available (YES branch of step 408), optical device 200 may start receiving communication events via one or more optical fibers, such as optical fibers 116A-116N, optical signal 230 using inverse signaling protocol (410). As described above, received signal splitter 202 may split optical signal 230 and distribute the optical signal to photovoltaic component 204 and optical detector 210. Photovoltaic component 204 may convert optical energy to electrical energy as described above (412).

Optical detector 210 may extract a communication signal and output an electrical signal 246 to device electronics 218 via amplifier 214 and signal processor 216. Optical detector 210 may also redirect at least a portion of optical signal 240 to the photovoltaic component 204, which may convert the optical signal into additional electrical energy (412). Energy storage element 206 may store the electrical energy for later use by optical device 200 (414).

Device electronics 218 of optical device 200 may be configured to perform one or more device functions as described above (416) in response to receiving the communication signal from signal processor 216. Device electronics 218 may also be configured to send electrical communication signal 252 to fiber optics transmitter 220. Electrical communication signal 252 may include measurement information, actuator status, or other information, as described above.

An optical signal transmitter, such as fiber optics transmitter 220, may be configured to receive electrical communication signal 252 from device electronics 218 and convert the communication signal to an optical output signal 254 encoded using a normal signaling protocol. Fiber optics transmitter 220 may output optical output signal 254 to, for example, controller 102. In other words, fiber optics transmitter 220 may send device information, e.g. sensor information, using a normal signaling protocol (418).

Optical device 200 may verify whether all communication with controller 102 is complete (420). If not (NO branch of step 420), optical device 200 may continue receiving optical signals 230 using inverse signaling protocol (410). When communications are complete (YES branch of step 420), optical device 200 may stop transmitting (422).

In some examples, optical device 200 may indicate to controller 102 that the electrical energy stored in electrical energy storage element 206 is greater than a threshold. Controller 102 may stop transmitting optical energy, except for communication events including communication optical signals.

An optical device functioning according to the steps above may have advantages over other types of optical devices. Receiving optical signals with inverse signaling protocol may have advantages including simultaneous power optical signals with communication optical signals. Inverse signaling may also efficiently transmit optical energy to an optical device operating according to this disclosure. By sending optical communication using normal signaling protocol, and optical device of this disclosure may minimize energy use, as described above, and conserve electrical energy.

In one or more examples, the functions described above may be implemented in hardware, software, firmware, or any combination thereof. For example, the various components of FIG. 3, such as device electronics 218 and output signal processor 216 may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media, such may be included in controller 102 of FIG. 1, can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media. In some examples, the data can be post-processed to trend engine performance and provide maintenance annunciation as required.

Instructions may be executed by one or more processors, such as one or more DSPs, general purpose microprocessors, ASICs, FPGAs, or other equivalent integrated or discrete logic circuitry. Accordingly, the term "processor," as used herein, such as processor 330 or controller and signal generator 320, may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Example 1

A method comprising: receiving, by an optical device and via an optical fiber, a first optical signal encoded using an inverse signaling protocol converting, by the optical device, the first optical signal into an electrical signal; performing, by the optical device, at least one function in response to the optical signal; and outputting, by the optical device, via the optical fiber, an outgoing optical signal encoded using a normal signaling protocol.

Example 2

The method of example 1, wherein the inverse signaling protocol comprises first intervals representing logical zeroes and second intervals representing logical ones, and wherein the optical device receives optical energy via the optical signal during the first interval.

Example 3

The method of any of examples 1-2 or any combination thereof, wherein the inverse signaling protocol comprises first intervals representing logical zeroes and second intervals representing logical ones, wherein the first optical signal comprises a baseline optical power amplitude during both the first and second intervals, and wherein the logical ones and logical zeros are defined by amplitude modulation from the baseline optical power amplitude.

Example 4

The method of any combination of examples 1-3, wherein the normal signaling protocol comprises first intervals representing logical zeroes and second intervals representing logical ones, and wherein the optical device outputs optical energy during the second intervals.

Example 5

The method of any combination of examples 1-4, further comprising storing, by the optical device, at least a portion of electrical energy in the electrical signal in an electrical energy storage element.

Example 6

The method of any combination of examples 1-5, further comprising: splitting, by an optical input element of the optical device, the first optical signal into a first incoming optical signal and a second incoming optical signal; receiving, by a photovoltaic component, the first incoming optical signal; converting, by the photovoltaic component, the first incoming optical signal to first electrical energy; storing, in an energy storage element, the first electrical energy; receiving, by an optical detector, the second incoming optical signal; outputting, by the optical detector, the electrical signal; redirecting, by the optical detector, at least a portion of the second incoming optical signal to the photovoltaic component; receiving, by the photovoltaic component, the at least a portion of the second incoming optical signal; converting, by the photovoltaic component, the at least a portion of the second incoming optical signal to second electrical energy; storing, in the energy storage element, the second electrical energy.

Example 7

The method of any combination of examples 1-6, wherein the first optical signal comprises a communications optical signal, the method further comprising: receiving, by the optical device and via the first optical fiber, a second optical signal, wherein the second optical signal comprises a power optical signal; converting, by the optical device, optical energy from the second optical signal into electrical energy; storing, by the optical device, the electrical energy in an electrical energy storage element.

Example 8

The method of any combination of examples 1-7, wherein the optical fiber comprises a first optical fiber, the method further comprising receiving, by the optical device and via a second optical fiber, a second optical signal.

Example 9

The method of any combination of examples 1-8, wherein the first optical signal comprises a first wavelength and the second optical signal comprises a second wavelength.

Example 10

The method of any combination of examples 1-9, wherein the at least one function comprises one or more of: temperature measurement, pressure measurement, flow rate measurement, rotational speed measurement, relay actuation, valve actuation, flow control, mechanical position control, and embedded control algorithms for real time data processing and real-time control function.

Example 11

An optical device comprising; an optical signal input element, wherein the optical signal input element is configured to receive a first optical signal encoded using an inverse signaling protocol; an optical signal detector configured to: receive at least a first portion of the first optical signal from the optical signal input element, and extract a first communication signal from the at least a first portion of first optical signal; device electronics configured to, in response to receiving the first communication signal from the optical signal detector, perform at least one function; and an optical signal transmitter configured to: receive a second communication signal from the device electronics; convert the second communication signal to an optical output signal encoded using a normal signaling protocol; and output the optical output signal.

Example 12

The optical device of example 11, further comprising: a photovoltaic component configured to: receive at least a second portion of the first optical signal from the optical signal input element, and convert the at least a second portion of the first optical signal to electrical power.

Example 13

The optical device of any combination of examples 11-12, further comprising an optical energy redirection element, wherein the optical energy redirection element is configured to: transmit the at least a first portion of first optical signal to the optical detector; and redirect the at least a first portion of the first optical signal to the photovoltaic component.

Example 14

The optical device of any combination of examples 11-13, further comprising an electrical energy storage element, wherein the electrical energy storage element is configured to: receive the electrical power from the photovoltaic component; store at least a portion of the electrical power; and provide at least a portion of the stored electrical power to the device electronics.

Example 15

The optical device of any combination of examples 11-14, wherein inverse signaling protocol comprises first intervals representing logical zeroes and second intervals representing logical ones, wherein the first optical signal comprises a baseline optical power amplitude during both the first and second intervals, and wherein the logical ones and logical zeros are defined by amplitude modulation from the baseline optical power amplitude.

Example 16

The optical device of any combination of examples 11-15, wherein the at least one function comprises one or more of: temperature measurement, pressure measurement, flow rate measurement, rotational speed measurement, relay actuation, valve actuation, flow control and mechanical position control, embedded control algorithms for real time data processing and real-time control function.

Example 17

A system comprising, a controller, comprising: one or more processors; a controller optical signal output element; and a controller optical signal input element; a first optical fiber and a second optical fiber; an optical device, comprising: an optical signal input element, wherein the optical signal input element is configured to receive a first optical signal encoded using an inverse signaling protocol from the controller optical signal output element via the first optical fiber; an optical signal detector configured to: receive at least a first portion of the first optical signal from the optical signal input element, and extract a first communication signal from the at least a first portion of first optical signal; device electronics configured to, in response to receiving the first communication signal from the optical signal detector, perform at least one function; and an optical signal transmitter configured to: receive a second communication signal from the device electronics; convert the second communication signal to a second optical signal encoded using a normal signaling protocol; and output the second optical signal to the controller optical signal input element via the second optical fiber.

Example 18

The system of example 17, wherein the optical device node is a first optical device node, the system further comprising a second optical device node.

Example 19

The system of any combination of examples 17-18, wherein the first communication signal comprises a command and the second communication signal comprises an indication that the command has been completed.

Example 20

The system of any combination of examples 17-19, further comprising a temperature sensor at the optical device node, wherein the second communication signal comprises an indication of a temperature measurement from the temperature sensor.

Various examples of the disclosure have been described. These and other examples are within the scope of the following claims.

The invention claimed is:

1. A method comprising:
    receiving, by an optical device and via an optical fiber, a first optical signal encoded using an inverse signaling protocol;
    splitting, by an optical input element of the optical device, the first optical signal into a first incoming optical signal and a second incoming optical signal;
    receiving, by a photovoltaic component, the first incoming optical signal;
    converting, by the photovoltaic component, the first incoming optical signal to first electrical energy;
    storing, in an energy storage element, the first electrical energy;

receiving, by an optical detector, the second incoming optical signal;
converting, by the optical detector, the first optical signal into an electrical signal;
outputting, by the optical detector, the electrical signal;
redirecting, by the optical detector, at least a portion of the second incoming optical signal to the photovoltaic component;
receiving, by the photovoltaic component, the at least a portion of the second incoming optical signal;
converting, by the photovoltaic component, the at least a portion of the second incoming optical signal to second electrical energy;
storing, in the energy storage element, the second electrical energy;
performing, by the optical device, at least one function in response to the optical signal; and
outputting, by the optical device, via the optical fiber, an outgoing optical signal encoded using a normal signaling protocol.

2. The method of claim 1, wherein the inverse signaling protocol comprises first intervals representing logical zeroes and second intervals representing logical ones, and wherein the optical device receives optical energy via the optical signal during the first interval.

3. The method of claim 1, wherein the inverse signaling protocol comprises first intervals representing logical zeroes and second intervals representing logical ones, wherein the first optical signal comprises a baseline optical power amplitude during both the first and second intervals, and wherein the logical ones and logical zeros are defined by amplitude modulation from the baseline optical power amplitude.

4. The method of claim 1, wherein the normal signaling protocol comprises first intervals representing logical zeroes and second intervals representing logical ones, and wherein the optical device outputs optical energy during the second intervals.

5. The method of claim 1, wherein the first optical signal comprises a communications optical signal, the method further comprising:
receiving, by the optical device and via the first optical fiber, a second optical signal, wherein the second optical signal comprises a power optical signal;
converting, by the optical device, optical energy from the second optical signal into third electrical energy;
storing, by the optical device, the third electrical energy in an electrical energy storage element.

6. The method of claim 1, wherein the optical fiber comprises a first optical fiber, the method further comprising receiving, by the optical device and via a second optical fiber, a second optical signal.

7. The method of claim 6, wherein the first optical signal comprises a first wavelength and the second optical signal comprises a second wavelength.

8. The method of claim 1, wherein the at least one function comprises one or more of: temperature measurement, pressure measurement, flow rate measurement, rotational speed measurement, relay actuation, valve actuation, flow control, mechanical position control, and embedded control algorithms for real time data processing and real-time control function.

9. The method of claim 1, wherein the optical device comprises a sensor remote from a controller, and wherein receiving the first optical signal encoded using the inverse signaling protocol comprises receiving, by the sensor, from the controller and via the optical fiber, the first optical signal encoded using the inverse signaling protocol.

10. An optical device comprising;
an optical signal input element, wherein the optical signal input element is configured to:
receive a first optical signal encoded using an inverse signaling protocol; and
split the first optical signal into a first incoming optical signal and a second incoming optical signal;
a photovoltaic component configured to:
receive at least the first incoming optical signal from the optical signal input element, and
convert the first incoming optical signal to first electrical energy;
an optical detector configured to:
receive the second incoming optical signal;
convert the second incoming optical signal to an electrical signal; and
redirect at least a portion of the second incoming optical signal to the photovoltaic component,
wherein the photovoltaic component is further configured to:
receive the at least a portion of the second incoming optical signal; and
convert the at least a portion of the second incoming optical signal to second electrical energy;
an energy storage element configured to store the first electrical energy and the second electrical energy;
device electronics configured to, in response to receiving the first communication signal from the optical signal detector, perform at least one function; and
an optical signal transmitter configured to:
receive a second communication signal from the device electronics;
convert the second communication signal to an optical output signal encoded using a normal signaling protocol; and
output the optical output signal.

11. The optical device of claim 10, wherein:
normal signaling protocol comprises first intervals representing logical zeroes and second intervals representing logical ones, and wherein the optical device outputs optical energy during the second intervals,
inverse signaling protocol comprises first intervals representing logical zeroes and second intervals representing logical ones, wherein the first optical signal comprises a baseline optical power amplitude during both the first and second intervals, and wherein the logical ones and logical zeros are defined by amplitude modulation from the baseline optical power amplitude.

12. The optical device of claim 10, wherein the at least one function comprises one or more of: temperature measurement, pressure measurement, flow rate measurement, rotational speed measurement, relay actuation, valve actuation, flow control and mechanical position control, embedded control algorithms for real time data processing and real-time control function.

13. A system comprising,
a controller, comprising:
one or more processors;
a controller optical signal output element; and
a controller optical signal input element;
a first optical fiber and a second optical fiber;
an optical device, comprising:
an optical signal input element, wherein the optical signal input element is configured to:
receive a first optical signal encoded using an inverse signaling protocol from the controller optical signal output element via the first optical fiber; and split the first optical signal into a first incoming optical signal and a second incoming optical signal;

a photovoltaic component configured to:
  receive at least the first incoming optical signal from the optical signal input element, and
  convert the first incoming optical signal to first electrical energy;

an optical detector configured to:
  receive the second incoming optical signal;
  convert the second incoming optical signal to an electrical signal; and
  redirect at least a portion of the second incoming optical signal to the photovoltaic component, wherein the photovoltaic component is further configured to:
  receive the at least a portion of the second incoming optical signal; and
  convert the at least a portion of the second incoming optical signal to second electrical energy;

an energy storage element configured to store the first electrical energy and the second electrical energy;

device electronics configured to, in response to receiving the first communication signal from the optical signal detector, perform at least one function; and an optical signal transmitter configured to:
  receive a second communication signal from the device electronics;
  convert the second communication signal to a second optical signal encoded using a normal signaling protocol; and
  output the second optical signal to the controller optical signal input element via the second optical fiber.

14. The system of claim 13, wherein the optical device node is a first optical device node, the system further comprising a second optical device node.

15. The system of claim 14, wherein the first communication signal comprises a command and the second communication signal comprises an indication that the command has been completed.

16. The system of claim 14, further comprising a temperature sensor at the optical device node, wherein the second communication signal comprises an indication of a temperature measurement from the temperature sensor.

* * * * *

UNITED STATES PATENT AND TRADEMARK OFFICE
CERTIFICATE OF CORRECTION

| | | |
|---|---|---|
| PATENT NO. | : 10,313,026 B2 | Page 1 of 1 |
| APPLICATION NO. | : 15/634453 | |
| DATED | : June 4, 2019 | |
| INVENTOR(S) | : Richard Joseph Skertic et al. | |

It is certified that error appears in the above-identified patent and that said Letters Patent is hereby corrected as shown below:

On the Title Page (73) Replace Indianapolis, IL (US) with -- Indianapolis, IN (US) --

Signed and Sealed this
Twenty-fourth Day of December, 2019

Andrei Iancu
*Director of the United States Patent and Trademark Office*